(12) United States Patent
Liao et al.

(10) Patent No.: US 12,706,297 B2
(45) Date of Patent: Aug. 11, 2026

(54) NEGATIVE ELECTRODE MATERIAL, NEGATIVE ELECTRODE PLATE AND ELECTROCHEMICAL DEVICE CONTAINING SAME, AND ELECTRONIC DEVICE

(71) Applicant: Ningde Amperex Technology Limited, Ningde City (CN)

(72) Inventors: Qunchao Liao, Ningde City (CN); Hang Cui, Ningde City (CN); Yuansen Xie, Ningde City (CN); Chao Wang, Ningde City (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 876 days.

(21) Appl. No.: 17/952,646

(22) Filed: Sep. 26, 2022

(65) Prior Publication Data

US 2023/0034617 A1 Feb. 2, 2023

Related U.S. Application Data

(63) Continuation of application No. PCT/CN2020/081370, filed on Mar. 26, 2020.

(51) Int. Cl.
*H01M 4/133* (2010.01)
*H01M 4/02* (2006.01)
(Continued)

(52) U.S. Cl.
CPC ........... *H01M 4/133* (2013.01); *H01M 4/134* (2013.01); *H01M 4/587* (2013.01); *H01M 2004/027* (2013.01)

(58) Field of Classification Search
CPC ...... H01M 4/133; H01M 4/134; H01M 4/587; H01M 2004/027
See application file for complete search history.

(56) References Cited

U.S. PATENT DOCUMENTS 10,777,841 B2 9/2020 Otaki et al.
2012/0064403 A1* 3/2012 Kameda et al.
(Continued)

FOREIGN PATENT DOCUMENTS

CN 106663807 A 5/2017
CN 108140834 A 6/2018
(Continued)

OTHER PUBLICATIONS

JPWO2019069668A1_Machine Translation (Year: 2019).*
(Continued)

*Primary Examiner* — Niki Bakhtiari
*Assistant Examiner* — Lilian Alice Odom
(74) *Attorney, Agent, or Firm* — WHDA, LLP

(57) ABSTRACT

A negative electrode material includes silicon-based particles and graphite particles. In a case that a $D_{n50}/D_{v50}$ ratio of the graphite particles is A and a $D_{n50}/D_{v50}$ ratio of the silicon-based particles is B, the following conditional expressions (1) to (3) are satisfied: $0.1 \leq A \leq 0.65$ (1); $0.3 \leq B \leq 0.85$ (2); and $B > A$ (3), where, $D_{v50}$ is a particle diameter of particles measured when a cumulative volume fraction in a volume-based distribution reaches 50%, and $D_{n50}$ is a particle diameter of particles measured when a cumulative number fraction in a number-based distribution reaches 50%. The present invention further provides a negative electrode plate, a lithium-ion secondary battery or electrochemical device containing the negative electrode plate, and an electronic device containing the lithium-ion secondary battery and/or electrochemical device.

20 Claims, 3 Drawing Sheets

(51) Int. Cl.

| | |
|---|---|
| ***H01M 4/134*** | (2010.01) |
| ***H01M 4/587*** | (2010.01) |

(56) References Cited

U.S. PATENT DOCUMENTS

| | | | |
|---|---|---|---|
| 2017/0256791 | A1 | 9/2017 | Kurita et al. |
| 2018/0287141 | A1 | 10/2018 | Kurita et al. |
| 2019/0006656 | A1* | 1/2019 | Matsuno et al. |
| 2019/0013542 | A1 | 1/2019 | Otaki et al. |
| 2019/0363348 | A1 | 11/2019 | Kurita et al. |
| 2020/0295359 | A1 | 9/2020 | Otsuka et al. |

FOREIGN PATENT DOCUMENTS

| | | | | |
|---|---|---|---|---|
| CN | 109216656 | A | | 1/2019 |
| CN | 109923708 | A | | 6/2019 |
| CN | 110890531 | A | | 3/2020 |
| JP | 2012124118 | A | * | 6/2012 |
| JP | WO2019069668 | A1 | * | 11/2019 |
| WO | 2019/069668 | A1 | | 4/2019 |
| WO | 102025119 | B1 | * | 11/2019 |
| WO | WO2019220576 | A1 | * | 11/2019 |

OTHER PUBLICATIONS

JP2012124118A_Machine Translation (Year: 2012).*
WO2019220576A1_Machine Translation (Year: 2019).*
KR102025119B1_Machine Translation (Year: 2019).*
International Search Report dated Dec. 25, 2020, issued in counterpart International Application No. PCT/CN2020/081370 (2 pages).

* cited by examiner

NEGATIVE ELECTRODE MATERIAL, NEGATIVE ELECTRODE PLATE AND ELECTROCHEMICAL DEVICE CONTAINING SAME, AND ELECTRONIC DEVICE

CROSS REFERENCE TO THE RELATED APPLICATIONS

The present application is a continuation application of PCT application PCT/CN2020/081370, filed on Mar. 26, 2020, the disclosure of which is hereby incorporated by reference in its entirety.

TECHNICAL FIELD

The present invention relates to the technical field of batteries, in particular, to the technical field of lithium-ion batteries, and specifically, to a negative electrode material, a negative electrode plate coated with the negative electrode material, an electrochemical device containing the negative electrode plate, and an electronic device.

BACKGROUND

As a next-generation high-capacity negative electrode material, a silicon-based material can significantly increase an energy density of a battery. Especially, a silicon-oxygen material in the silicon-based materials possesses the advantages such as a high specific capacity (2400 mAh/g), abundant raw material sources, and environmental friendliness. However, a hybrid negative electrode made of the silicon-oxygen material incurs a relatively high degree of volume expansion and shrinkage during deintercalation and intercalation. This makes the silicon-oxygen material particles keep migrating, increases a porosity of the negative electrode plate, leads to failure of connection between active materials in the electrode plate, increases a capacity fading speed and a deformation rate of the battery, and severely impairs the effect of the material in practical applications.

Existing technologies for improving battery cycle performance and reducing battery deformation mainly focus on improving the structure and interface of silicon-based materials, and achieve good improvement effects. However, the practice of simply improving the silicon-based material but without considering a reasonable conjunction between the graphite material in the hybrid negative electrode and a morphology and a particle diameter is unable to fully exert electrical performance of the negative electrode. Researches show that the negative electrodes prepared from the graphite particles of different morphologies and diameters in conjunction with the silicon-based material differ greatly in the distribution of the silicon-based material, porosity of the electrode plate, distribution of pores, and the like. Such factors are crucial to cycle performance and deformation of the battery.

SUMMARY

In view of the problems in the prior art, one of objectives of the present invention is to provide a negative electrode material to improve cycle performance and a deformation rate of a battery by means of reasonable matching of morphology and particle size between a silicon-based material and a graphite material. In addition, on the basis of the reasonable matching between the silicon-based material and the graphite material, characteristics such as particle size distribution, sphericity, and XRD features of the silicon-based particles and graphite particles are further defined to obtain a negative electrode material of higher performance.

Another objective of the present invention is to provide a negative electrode plate containing the foregoing negative electrode material, a method for preparing the negative electrode plate, a lithium-ion secondary battery, a method for preparing the lithium-ion secondary battery, an electrochemical device, and an electronic device.

For such purposes, the present invention provides a negative electrode material. The negative electrode material contains silicon-based particles and graphite particles. In a case that a $D_{n50}/D_{v50}$ ratio of the graphite particles is A and a $D_{n50}/D_{v50}$ ratio of the silicon-based particles is B, the following conditional expressions (1) to (3) are satisfied:

$$0.1 \le A \le 0.65 \quad (1);$$

$$0.3 \le B \le 0.85 \quad (2); \text{ and}$$

$$B > A \quad (3).$$

$D_{v50}$ is a particle diameter of particles measured when a cumulative volume fraction in a volume-based distribution reaches 50%; and $D_{n50}$ is a particle diameter of particles measured when a cumulative number fraction in a number-based distribution reaches 50%.

$D_{n50}/D_{v50}$ is a ratio of $D_{n50}$ to $D_{v50}$ measured by a laser scattering particle size analyzer. The closer the value is to 1, the more concentrated the particle size distribution. In the negative electrode material according to the present invention, when the concentration degree of the graphite particles is lower than the concentration degree of the silicon-based particles, the battery exhibits higher cycle performance and a lower deformation rate. That is because lithiation-induced expansion of the silicon-based material is much larger than that of the graphite material. In order to reduce a stress generated during the expansion, an average particle diameter of the silicon-based particles is set to be smaller than an average particle diameter of the graphite particles. In a case that an active material on an electrode plate is compounded of the silicon-based particles and the graphite particles, the distribution of the silicon-based particles is more concentrated than the distribution of the graphite particles. This helps to disperse the silicon-based particles into voids between the packed graphite particles, and minimizes the impact caused by the expansion of the silicon-based material onto the overall expansion of the electrode plate, thereby improving the cycle performance and deformation rate of the battery.

Specifically, when the $D_{n50}/D_{v50}$ ratio of the graphite particles falls within the range of 0.1 to 0.65, electrical performance of the battery is relatively high. When the $D_{n50}/D_{v50}$ ratio of the gaphite particles is less than 0.1, there are excessive fine particles and large particles in the graphite particles. The excessive fine particles lead to an excessive specific surface area of the material, and reduce the first-cycle Coulombic efficiency. The excessive large particles increase a transmission distance of lithium ions, aggravate the deformation of the battery, and deteriorate rate performance of the battery. When the $D_{n50}/D_{v50}$ ratio of the graphite particles is greater than 0.65, the particle size distribution of the graphite particles is excessively concentrated, thereby being adverse to packing the graphite particles in the negative electrode plate, and increasing the processing cost significantly.

Specifically, when the $D_{n50}/D_{v50}$ ratio of the silicon-based particles falls within the range of 0.3 to 0.85, the electrical performance of the battery is relatively high. When the $D_{n50}/D_{v50}$ ratio of the silicon-based particles is less than 0.3, the distribution of the silicon-based particles is lowly concentrated, and numerous oversized or undersized silicon-based particles exist. The excessive number of the undersized silicon-based particles increases the area of contacting the electrolytic solution, generates a larger amount of solid electrolyte interphase film (SEI film), and consumes the limited reversible lithium in the battery. The oversized silicon-based particles increase the stress generated during the lithiation-induced expansion, cause the silicon-based particles to rupture, make a fresh interface exposed to react with the electrolytic solution, consume reversible lithium, and deteriorate the cycle performance. In addition, the oversized silicon-based particles increase diffusion paths of lithium ions, aggravate concentration polarization, and affect the rate performance of the battery. When the $D_{n50}/D_{v50}$ ratio of the silicon-based particles is greater than 0.85, mass production is impracticable due to a low yield rate and high cost.

For the negative electrode material according to the present invention, preferably, in a case that an average sphericity of the graphite particles is C and an average sphericity of the silicon-based particles is D, the following conditional expression (4) is satisfied:

$$0.1 \leq D - C \leq 0.3 \quad (4).$$

For the negative electrode material according to the present invention, preferably, an average sphericity D of the silicon-based particles is greater than or equal to 0.8.

For the negative electrode material according to the present invention, preferably, an average sphericity C of the graphite particles falls between 0.55 and 0.75, that is, $0.55 \leq C \leq 0.75$.

For the negative electrode material according to the present invention, preferably, a general formula of the silicon-based particles is: $SiO_xC_yM_z$ (I), where $0 \leq x \leq 2$, $0 \leq y \leq 1$, $0 \leq z \leq 0.5$. and M includes at least one of lithium, magnesium, titanium, or aluminum.

For the negative electrode material according to the present invention, preferably, a carbon coating, a polymer coating, or a composite coating of carbon and polymer exists on a surface of the silicon-based particles.

For the negative electrode material according to the present invention, preferably, a carbon coating, a polymer coating, or a composite coating of carbon and polymer exists on a surface of the graphite particles.

For the negative electrode material according to the present invention, preferably, the carbon coating is formed by at least one of crystalline carbon, carbon nanotubes, carbon nanoparticles, vapor grown carbon fibers, or graphene. Further preferably, the carbon coating further contains a metal, and the metal includes at least one of aluminum or titanium.

For the negative electrode material according to the present invention, preferably, the polymer coating is formed by at least one of polyvinylidene difluoride or a derivative thereof, carboxymethyl cellulose or a derivative thereof, polyvinylpyrrolidone or a derivative thereof, polyacrylic acid or a derivative thereof, or polystyrene butadiene rubber. The derivative means a relatively complex product derived by substituting a hydrogen atom or atomic group in a simple compound by another atom or atomic group.

For the negative electrode material according to the present invention, preferably, a thickness of the coating of the silicon-based particles is 0.5 to 50 nm.

For the negative electrode material according to the present invention, preferably, a mass of the coating of the silicon-based particles is 0.1% to 10% of a total mass of the silicon-based particles.

For the negative electrode material according to the present invention, preferably, a particle diameter range of the silicon-based particles is 0.01 to 50 μm.

For the negative electrode material according to the present invention, preferably, in an X-ray diffractogram of the silicon-based particles, in a case that a maximum intensity value when 2θ falls within a range of 20.5° to 21.5° is I1 and the maximum intensity value when 2θ falls within a range of 28.0° to 29.0° is I2, it is satisfied that I2/I1 is less than or equal to 10, and preferably I2/I1 is less than or equal to 1.

For the negative electrode material according to the present invention, preferably, a specific surface area of the silicon-based particles is 0.1 to 50 $m^2/g$, and preferably 0.1 to 5 $m^2/g$.

For the negative electrode material according to the present invention, preferably, in a Raman scattering peak of the graphite particles, in a case that a peak intensity at 1330 $cm^{-1}$ is $I_{1330}$ and the peak intensity at 1580 $cm^{-1}$ is $I_{1580}$, the following conditional expression (5) is satisfied:

$$0.05 \leq I_{1330}/I_{1580} \leq 0.9 \quad (5).$$

For the negative electrode material according to the present invention, preferably, the graphite particles include a secondary particle, and a weight percent of the secondary particle is at least 70 wt % of a total weight of the graphite particles.

For the negative electrode material according to the present invention, preferably, in an X-ray diffraction peak of the graphite particles, in a case that a peak intensity ratio between a (004) peak and a (110) peak is an orientation index (OI) value, the following conditional expression (6) is satisfied:

$$1 \leq \text{OI value} \leq 30 \quad (6).$$

For such purposes, the present invention further provides a negative electrode plate, including the negative electrode Material described above.

For such purposes, the present invention further provides a method for preparing a negative electrode plate. The method includes the following steps:

(a) mixing the foregoing negative electrode material with a conductive agent to obtain a first mixture;
(b) mixing the first mixture with a binder in a solvent to obtain a first mixed shiny; and
(c) coating a current collector with the first mixed slurry, and performing drying, cold calendering, and slitting to obtain a negative electrode plate.

In the preparation method according to the present invention, preferably, in the first mixture, the content of silicon-based particles is 5 wt % to 30 wt % the content of the conductive agent is 0.5 wt % to 5 wt %, and the remainder is graphite particles.

In the preparation method according to the present invention, preferably, the conductive agent includes at least one of nanoscale conductive carbon black, carbon nanotubes, carbon fibers, flake graphite, gaphene, Ketjen black.

In the preparation method according to the present invention, preferably, the carbon nanotubes include single-walled carbon nanotubes, multi-walled carbon nanotubes, or a combination thereof; and the carbon fibers include vapor-grown carbon fibers, carbon nanofibers, or a combination of thereof.

In the preparation method according to the present invention preferably, the weight ratio between the first mixture and the binder is 100:(1 to 6).

In the preparation method according to the present invention preferably, the binder includes at least one of polyacrylic acid, polyacrylic acid sodium, polyacrylic acid potassium, polyacrylic acid lithium, polyimide, polyvinyl alcohol, carboxymethyl cellulose, sodium carboxymethyl cellulose, polyimide, polyamide imide, styrene butadiene rubber, or polyvinylidene fluoride.

In the preparation method according to the present invention, preferably, the solvent includes at least one of deionized water or N-methyl-pyrrolidone.

In the preparation method according to the present invention, preferably, the current collector is prepared from at least one of copper, copper alloy, nickel, or nickel alloy.

In the preparation method according to the present invention, preferably, a thickness of an active layer of the negative electrode plate is 50 to 200 μm, a single-side compacted density of the active layer is 1.4 to 1.9 g/cm$^3$, and a porosity of the active layer is 15% to 35%.

For such purposes, the present invention further provides a lithium-ion secondary battery. The battery includes a positive electrode plate, the foregoing negative electrode plate, a separator, and an electrolytic solution.

For such purposes, the present invention further provides a method for preparing a lithium-ion secondary battery. The method includes the following steps:

S1. mixing a positive electrode material, a conductive agent, a binder, and a solvent, and stirring to make a first positive mixed slurry;

S2. coating a current collector with the first positive mixed slurry obtained in step S1, and performing drying, cold calendering, and slitting to obtain a positive electrode plate; and S3. winding the positive electrode plate obtained in step S2, the foregoing negative electrode plate, and a separator to obtain a bare cell; and S4. putting the bare cell obtained in step S3 into a packaging bag, performing drying, injecting an electrolytic solution, and performing sealing and chemical formation to obtain a lithium-ion secondary battery.

In the preparation method according to the present invention, preferably, the positive electrode material includes lithium composite oxide. The lithium composite oxide includes a transition metal. The transition metal includes at least one of nickel, manganese, cobalt, or iron.

In the preparation method according to the present invention, preferably, the conductive agent in step S1 includes at least one of nanoscale conductive carbon black, carbon nanotubes, carbon fibers, flake graphite, graphene, or Ketjen black.

In the preparation method according to the present invention, preferably, the separator is prepared from at least one of glass fiber, polyester, polyethylene, polypropylene, or polytetrafluoroethylene. The separator is a porous polymer film with a pore diameter of 0.01 μm to 1 μm. The thickness of the separator is 5 μm to 500 μm.

In the preparation method according to the present invention, preferably, the electrolytic solution includes an organic solvent, a lithium salt, and an additive. The lithium salt is an organic lithium salt and/or an inorganic lithium salt.

In the preparation method according to the present invention, preferably, the organic solvent includes at least one of ethylene carbonate, propylene carbonate, diethyl carbonate, ethyl methyl carbonate, dimethyl carbonate, propylene carbonate, or ethyl propionate.

The preparation method according the present invention, preferably, the organic lithium salt includes at least one of lithium hexafluorophosphate, lithium tetrafluoroborate, lithium difluorophosphate, lithium bis(trifluoromethanesulfonyl)imide, lithium bis(fluorosulfonyl)imide, lithium bis(oxalato)borate, or lithium difluoro(oxalato)borate.

For such purposes, the present invention further provides an electrochemical device. The electrochemical device includes the foregoing negative electrode plate.

For such purposes, the present invention further provides an electronic device. The electronic device includes the foregoing lithium-ion secondary battery and/or electrochemical device.

Beneficial effects of the present invention are as follows:

First, by reasonably matching the morphology and particle size distribution between the silicon-based particles and the graphite particles in the negative electrode material, the overall expansion stress of the negative electrode material can be dispersed uniformly. In this way, the silicon-based particles fill in the voids between the graphite particles, and the two types of particles mesh together like gears, thereby increasing the compacted density of the negative electrode material and suppressing a shift caused by the expansion of the silicon-based particles.

Second, on the basis of reasonably matching the morphology and particle size distribution between the silicon-based particles and the graphite particles, the present invention further defines: (1) the size of the silicon-based particles in the negative electrode material, so that a grain size is gadually reduced to an amorphous state; (2) a surface structure of the graphite particles; and (3) existence of a coating on the surface of the silicon-based particles and/or graphite particles. Finally, a negative electrode material with significantly improved cycle performance and rate performance is obtained. In addition, a negative electrode plate prepared from the negative electrode material can reduce the deformation rate of the battery during cycles.

DETAILED DESCRIPTION

Figure 1:
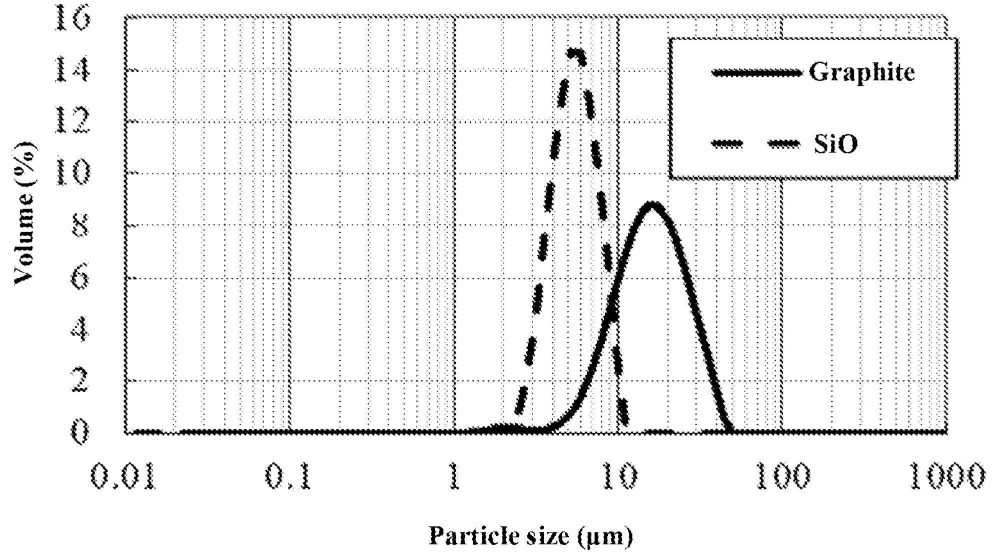
FIG. 1 is a volume-based particle size distribution curve of SiO particles and graphite particles according to Embodiment 1 of the present invention.

Embodiments of the present invention are described in detail below. The embodiments are implemented based on the technical solution of the present invention, and include detailed manners and processes of implementation, but the protection scope of the present invention is not limited to the following embodiments. An experimental method described in the following embodiments without specifying conditions are generally performed under conventional conditions.

The present invention provides a negative electrode material. The negative electrode material contains silicon-based particles and graphite particles. In a case that a $D_{n50}/D_{v50}$ ratio of the graphite particles is A and a $D_{n50}/D_{v50}$ ratio of the silicon-based particles is B, the following conditional expressions (1) to (3) are satisfied:

$$0.1 \le A \le 0.65 \quad (1);$$

$$0.3 \le B \le 0.85 \quad (2); \text{ and}$$

$$B > A \quad (3).$$

$D_{v50}$ is a particle diameter of particles measured when a cumulative volume fraction in a volume-based distribution reaches 50%; and $D_{n50}$ is a particle diameter of particles measured when a cumulative number fraction hr a number-based distribution reaches 50%.

$D_{n50}/D_{v50}$ is a ratio of $D_{n50}$ to $D_{v50}$ measured by a laser scattering particle size analyzer. The closer the value is to 1, the more concentrated the particle size distribution. In the negative electrode material according to the present invention, when the concentration degree of the graphite particles is lower than the concentration degree of the silicon-based particles, the battery exhibits higher cycle performance and a lower deformation rate. That is because lithiation-induced expansion of the silicon-based material is much larger than that of the graphite material. In order to reduce a stress generated during the expansion, an average particle diameter of the silicon-based particles is set to be smaller than an average particle diameter of the graphite particles. In a case that an active material on an electrode plate is compounded of the silicon-based particles and the graphite particles, the distribution of the silicon-based particles is more concentrated than the distribution of the graphite particles. This helps to disperse the silicon-based particles into voids between the packed graphite particles, and minimizes the impact caused by the expansion of the silicon-based material onto the overall expansion of the electrode plate, thereby improving the cycle performance and deformation rate of the battery.

Specifically, when the $D_{n50}/D_{v50}$ ratio of the graphite particles falls within the range of 0.1 to 0.65, the electrical performance of the battery is optimal. When the $D_{n50}/D_{v50}$ ratio of the graphite particles is less than 0.1, there are excessive fine particles and large particles in the graphite particles. The excessive fine particles lead to an excessive specific surface area of the material, and reduce the first-cycle Coulombic efficiency. The excessive large particles increase a transmission distance of lithium ions, and deteriorate the deformation rate and rate performance of the battery. In addition, when the $D_{n50}/D_{v50}$ ratio of the graphite particles is greater than 0.65, the particle size distribution of the graphite particles is excessively concentrated, thereby being adverse to packing the graphite particles in the negative electrode plate, and increasing the processing cost significantly.

Specifically, When the $D_{n50}/D_{v50}$ ratio of the silicon-based particles falls within the range of 0.3 to 0.85, the electrical performance of the battery is optimal. When the $D_{n50}/D_{v50}$ ratio of the silicon-based particles is less than 0.3, the distribution of the silicon-based particles is lowly concentrated, and numerous oversized or undersized silicon-based particles exist. The excessive number of the undersized silicon-based particles increases the area of contacting the electrolytic solution, generates a larger amount of solid electrolyte interphase film (SEI film), and consumes the electrolytic solution and the limited reversible lithium in the battery. The oversized silicon-based particles increase the stress generated during the lithiation-induced expansion, cause the silicon-based particles to rupture, make a fresh interface exposed to react with the electrolytic solution, consume reversible lithium, and deteriorate the cycle performance. In addition, the oversized silicon-based particles increase diffusion paths of lithium ions, aggravate concentration polarization, and affect the rate performance of the battery. When the $D_{n50}/D_{v50}$ ratio of the silicon-based particles is greater than 0.85, mass production is impracticable due to a low yield rate and high cost.

In some embodiments, in a case that an average sphericity of the graphite particles is C and an average sphericity of the silicon-based particles is D, the following conditional expression (4) is satisfied:

$$0.1 \le D - C \le 0.3 \quad (4).$$

In some embodiments, the average sphericity D of the silicon-based materials is greater than or equal to 0.8, and is, for example, but not limited to, 0.8, 0.9, or 1.0.

In some embodiments, the average sphericity C of the graphite particles falls between 0.55 and 0.75, and is, for example, but not limited to, 0.55, 0.65, or 0.75.

In some embodiments, a general formula of the silicon-based particles is: $SiO_xC_yM_z$ (I), where $0 \le x \le 2$, $0 \le y \le 1$, $0 \le z \le 0.5$, and M includes at least one. of lithium, magnesium, titanium, or aluminum. The silicon-based particles are, for example, but not limited to, commercial oxide of silicon $SiO_x$ ($0.5<x<1.5$), $SiO_xC_y$ ($0.5<x<1.5$, $0<y \le 0.1$), or $SiO_xC_yLi_z$ ($0.5<x<1.5$, $0<y \le 0.1$, $0 \le z \le 0.1$).

In some embodiments, a carbon coating, a polymer coating, or a composite coating of carbon and polymer exists on a surface of the silicon-based particles.

In some embodiments, a carbon coating, a polymer coating, or a composite coating of carbon and polymer exists on a surface of the graphite particles.

In some embodiments, the carbon coating is formed by at least one of crystalline carbon, carbon nanotubes, carbon nanoparticles, vapor grown carbon fibers, or graphene.

In some embodiments, the polymer coating is formed by at least one of polyvinylidene difluoride or a derivative thereof, carboxymethyl cellulose or a derivative thereof, polyvinylpyrrolidone or a derivative thereof, polyacrylic acid or a derivative thereof, or polystyrene butadiene rubber. The derivative means a relatively complex product derived by substituting a hydrogen atom or atomic group in a simple compound by another atom or atomic group. The derivative is, for example, but not limited to, sodium carboxymethyl cellulose, lithium carboxymethyl cellulose, polyacrylic acid sodium, or polyacrylic acid ammonium.

In some embodiments, the thickness of the coating of the silicon-based particles is 0.5 to 50 nm, for example, but not limited to, 0.5 nm, 10 nm, 20 nm, 30 nm, 40 nm, or 50 nm.

In some embodiments, a weight percent of the coating of the silicon-based particles is 0.1% to 10% of a total weight of the silicon-based particles, for example, but not limited to, 0.1%, 3%, 5%, 8%, or 10%.

In some embodiments, a particle size range of the silicon-based particles is 0.01 to 50 μm, for example, but not limited to, 0.01 μm, 1 μm, 10 μm, 20 μm, 30 μm, 40 μm, or 50 μm.

In some embodiments, in an X-ray diffractogram of the silicon-based particles, in a case that a maximum intensity value when 2θ falls within a range of 20.5° to 21.5° is I1 and the maximum intensity value when 2θ falls within a range of 28.0° to 29.0° is I2, it is satisfied that I2/I1 is less than or equal to 10, for example, but not limited to, 10, 5, 2, 1, and preferably I2/I1 is less than or equal to 1.

In some embodiments, the specific surface area of the silicon-based particles is 0.1 to 50 $m^2/g$, for example but not limited to, 0.1 $m^2/g$, 5 $m^2/g$, 10 $m^2/g$, 20 $m^2/g$, 30 $m^2/g$, 40 $m^2/g$, 50 $m^2/g$, and preferably 0.1 to 5 $m^2/g$.

In some embodiments, in a Raman scattering peak of the graphite particles, in a case that a peak intensity at 1330 $cm^{-1}$ is $I_{1330}$ and the peak intensity at 1580 $cm^{-1}$ is $I_{1580}$, the following conditional expression (5) is satisfied:

$$0.05 \leq I_{1330}/I_{1580} \leq 0.9 \quad (5).$$

In some embodiments, the graphite particles include a secondary particle, and a weight percent of the secondary particle is at least 70 wt % of a total weight of the graphite particles. In other embodiments, the graphite particles are formed of secondary particles and primary particles, where the weight percent of the secondary particles is at least 70 wt % and the remainder is primary particles.

In some embodiments, in an X-ray diffraction peak of the graphite particles, in a case that a peak intensity ratio between a (004) peak and a (110) peak is an orientation index (OI) value, the following conditional expression (6) is satisfied:

$$1 \leq \text{OI value} \leq 30 \quad (6).$$

The negative electrode plate according to the present invention is coated with the negative electrode material described above. The coating method may be a conventional electrode material coating method, without being limited herein.

The present invention further provides a method for preparing a negative electrode plate, including the following steps:

(a) mixing the foregoing negative electrode material with a conductive agent to obtain a first mixture;
(b) mixing the first mixture with a binder in a solvent to obtain a first mixed slurry; and
(c) coating a current collector with the first mixed slurry, and performing drying, cold calendering, and slitting to obtain a negative electrode plate.

In some embodiments, in the first mixture, the content of silicon-based particles is 5 wt % to 30 wt %, the content of the conductive agent is 0.5 wt % to 5 wt %, and the remainder is graphite particles. In some embodiments, the first mixture includes 5 wt % silicon-based particles, 0.5 wt % conductive agent, and the remainder is graphite particles. In some embodiments, the first mixture includes 30 wt % silicon-based particles, 0.5 wt % conductive agent, and the remainder is graphite particles. In some embodiments, the first mixture includes 30 wt % silicon-based particles, 5 wt % conductive agent, and the remainder is graphite particles. In some embodiments, the first mixture includes 15 wt % silicon-based particles, 2.5 wt % conductive agent, and the remainder is graphite particles.

In some embodiments, the conductive agent includes at least one of nanoscale conductive carbon black, carbon nanotubes, carbon fibers, or flake gaphite, gaphene, Ketjen black.

In some embodiments, the carbon nanotubes include single-walled carbon nanotubes, multi-walled carbon nanotubes, or a combination thereof; and the carbon fibers include vapor-grown carbon fibers, carbon nanofibers, or a combination of thereof.

In some embodiments, the weight ratio between the first mixture and the binder is 100:(1 to 6), for example, but not limited to, 100:1, 100:6, or 100:3.

In some embodiments, the binder includes at least one of polyacrylic acid, polyacrylic acid sodium, polyacrylic acid potassium, polyacrylic acid lithium, polyimide, polyvinyl alcohol, carboxymethyl cellulose, sodium carboxymethyl cellulose, polyimide, polyamide imide, styrene butadiene rubber, or polyvinylidene fluoride.

In some embodiments, the solvent includes at least one of deionized water and N-methyl-pyrrolidone.

In some embodiments, the current collector is prepared from at least one of copper, copper alloy, nickel, or nickel alloy.

In some embodiments, a thickness of an active layer of the negative electrode plate is 50 to 200 μm, a single-side compacted density of the active layer is 1.4 to 1.9 $g/cm^3$, and a porosity of the active layer is 15% to 35%.

The present invention provides a lithium-ion secondary battery. The battery includes a positive electrode plate, the foregoing negative electrode plate, a separator, and an electrolytic solution.

The present invention further provides a method for preparing the foregoing lithium-ion secondary battery, including the following steps:

S1. mixing a positive electrode material, a conductive agent, a binder, and a solvent, and stirring to make a first positive mixed slurry;

S2. coating a current collector with the first positive mixed slurry obtained in step S1, and performing drying, cold calendering, and slitting to obtain a positive electrode plate; and S3. winding the positive electrode plate obtained in step S2, the foregoing negative electrode plate, and a separator to obtain a bare cell; and S4. putting the bare cell obtained in step S3 into a packaging bag, performing drying, injecting an electrolytic solution, and performing sealing and chemical formation to obtain a lithium-ion secondary battery.

In some embodiments, the positive electrode material includes lithium composite oxide. The lithium composite oxide includes a transition metal. The transition metal includes at least one of nickel, manganese, cobalt, or iron.

In some embodiments, the conductive agent in step S1 includes at least one of nanoscale conductive carbon black, carbon nanotubes, carbon fibers, or flake graphite, graphene, or Ketjen black.

In some embodiments, the separator is prepared from at least one of glass fiber, polyester, polyethylene, polypropylene, or polytetrafluoroethylene. The separator is a porous polymer film with a pore diameter of 0.01 μm to 1 μm. The thickness of the separator is 5 μm to 500 μm.

In some embodiments, the electrolytic solution includes an organic solvent, a lithium salt, and an additive. The lithium salt is an organic lithium salt and/or an inorganic lithium salt.

In some embodiments, the organic solvent includes at least one of ethylene carbonate, propylene carbonate, diethyl carbonate, ethyl methyl carbonate, dimethyl carbonate, propylene carbonate, or ethyl propionate.

In some embodiments, the organic lithium salt includes at least one of lithium hexafluorophosphate, lithium tetrafluoroborate, lithium difluorophosphate, lithium bis(trifluoromethanesulfonyl)imide, lithium bis(fluorosulfonyl)imide, lithium bis(oxalato)borate, or lithium difluoro(oxalato)borate.

The electrochemical device according to the present invention includes the foregoing negative electrode plate.

The electronic device according to the present invention includes the foregoing lithium-ion secondary battery and/or electrochemical device.

I. Powder and Battery Performance Test

1. Observing micromorphology of powder particles: Observing the micromorphology of the powder by using a scanning electron microscope, and rendering the surface coating of the material, where the test instrument is: OXFORD EDS (X-max-20 $mm^2$) and the acceleration voltage is 15 KV. Adjusting the focal length, and observing the image at a high magnification of 50 K or above, and at a low magnification of 500 to 2000 that is mainly used for observing agglomeration of particles.

2. Sphericity test: Capturing images of a given number of (more than 5000) dispersed particles, and processing the images by using a Malvern automatic image particle size analyzer. Analyzing the microstructure and morphology of the particles accurately by means of a morphologically directed Raman spectroscopy (MDRS) to obtain a longest diameter and a shortest diameter of each particle, and calculating a ratio of the smallest diameter to the largest diameter to obtain the sphericity of the particle.

3. Specific surface area test: Measuring a quantity of a gas adsorbed on the surface of a solid under different relative pressures and at a constant low temperature, and then determining the monolayer adsorbed gas quantity of the specimen based on the Brunauer-Emmett-Teller (BET) adsorption theory, and calculating a specific surface area of the solid from the BET equation.

During the test, weighing out 1.5 to 3.5 grams of powder specimen, loading the specimen into a specimen tube of TriStar II 3020, degassing at 200° C. for 120 minutes, and then testing the specimen.

4. Particle size test (the size of a particle is referred to as a "particle size", also known as "particle diameter" or "diameter"): Adding approximately 0.02 gram of powder specimen into a 50 ml clean beaker, adding approximately 20 ml of deionized water, and then adding a few drops of 1% surfactant dropwise to make the powder fully dispersed in the water. Ultrasonically cleaning the specimen in a 120 W ultrasonic cleaning machine for 5 minutes. Measuring the particle size distribution by using a MasterSizer 2000. Using a laser scattering particle size analyzer to obtain: the diameter of a particle measured when the cumulative volume fraction of measured particles reaches 50% of the total volume of all specimen particles in a volume-based particle size distribution, and the diameter of a particle measured when the cumulative number fraction of measured particles reaches 50% of the total number of all specimen particles in a number-based particle size distribution.

5. Measuring a carbon content: Heating the specimen in a high-frequency furnace under an oxygen-rich condition to burn the specimen so that carbon and sulfur are oxidized into a gas of carbon dioxide and sulfitr dioxide respectively. Treating the gas, and passing the gas into a corresponding absorption pool to absorb infrared radiation, and then converting the absorbed infrared light into corresponding signals by using a detector. Converting the signals, which are sampled and linearly corrected in a computer, into a value proportional to the concentration of the carbon dioxide and the sulfur dioxide. Summing all such values obtained in the entire analysis process. Upon completion of the analysis, dividing the sum by the weight value in the computer, and then multiplying by a correction coefficient, and deducting blank values to obtain weight percentages of carbon and sulfur in the specimen. Testing the specimen by using a high-frequency infrared carbon-sulfur analyzer (HCS-140, manufactured by Shanghai Dekai Instrument Co., Ltd.).

6. Metal element content test: Weighing out a given amount of the material to serve as a specimen, adding a given amount of concentrated nitric acid into the specimen to digest the specimen into a solution by means of microwave. Filtering the solution to obtain a filtrate and a filter residue. Washing the residue for several times, and bringing the filtrate to a predetermined volume. Measuring the plasma intensity of a metal element in the solution by using an inductively coupled plasma optical emission spectroscopy (ICP-OES) instrument. Calculating the metal content in the solution according to a standard curve of the measured metal, and then calculating the weight percent of the metal element in the material.

7. XRD test: Weighing out 1.0 to 2.0 grams of the material to serve as a specimen. Pouring the specimen into a groove of a glass specimen rack. Compacting and flattening the specimen by using a glass sheet. Performing the XRD test by using an X-ray diffractometer (Bruker-D8) based on the standard JJS K 0131-1996 *General Rides for X-Ray Diffractometry*. Setting a test voltage to 40 kV, setting a current to 30 mA, setting a scanning angle to a value within a range of 10° to 85°, setting a scanning step length to 0.0167°, and setting a time of 0.24 s for each step length. Calculating a peak intensity ratio between the (004) peak and the (110) peak in the XRD diffraction peaks of graphite to obtain an OI value of the graphite.

8. Method for testing a button battery containing a powder material: Mixing the negative electrode material obtained in an embodiment, conductive carbon black, and a binder polyacrylic acid (PAA) at a weight ratio of 80:10:10 in deionized water. Stirring the mixture evenly to form a slurry. Coating a foil with the slurry for a thickness of 100 μm by using a scraper. Drying the foil in a vacuum oven at 85° C. for 12 hours. Cutting the foil into discs of 1 cm in diameter in a dry environment by using a stamping machine. Using a metal lithium sheet as a counter electrode in a glovebox. Using a Ceglard composite film as a separator. Injecting an electrolytic solution, and performing packaging to form a button battery. Performing a charge-and-discharge test on the battery by use of a LAND series battery test system to check the charge capacity and discharge capacity of the battery.

Discharging the battery at a current of 0.05 C until the voltage reaches 0.005 V, leaving the battery to stand for 5 minutes, and then discharging the battery at a current of 50 μA until the voltage reaches 0.005 V. Leaving the battery to stand for 5 minutes, and then discharging the battery at a current of 10 μA until the voltage reaches 0.005 V, so as to obtain a first-cycle lithiation capacity of the material. Charging the battery at a current of 0.1 C until the voltage reaches 2 V so as to obtain a first-cycle delithiation capacity. Finally, calculating a ratio of the first-cycle delithiation capacity to the first-cycle lithiation capacity to obtain the first-cycle Coulombic efficiency of the material.

II. Evaluating Full Battery

1. Cycle performance test: Charging the battery at a constant current of 0.7 C at 25° C. and 45° C. separately until the voltage reaches 4.4 V Charging the battery at a constant voltage until the current reaches 0.025 C. Leaving the battery to stand for 5 minutes, and then discharging the battery at a current of 0.5 C until the voltage reaches 3.0 V Using the capacity obtained in this step as an initial capacity. Performing a cycle test in which the battery is charged at 0.7 C and discharged at 0.5 C. Comparing the capacity obtained in each step with the initial capacity to obtain a plurality of ratios. Plotting a capacity fading curve by using the ratios. Performing charge-and-discharge cycles on the battery at 25° C. until the capacity retention rate drops to 90%, and teCording the number of cycles at this time as an indicator of the room-temperature cycle performance of the battery.

Performing charge-and-discharge cycles at 45° C. until the capacity retention rate drops to 80%, and recording the number of cycles at this time as an indicator of the high-temperature cycle performance of the battery. Comparing the two numbers of cycles to obtain the cycle performance of the material.

2. Discharge rate test: Discharging the battery at a rate of 0.2 C under a temperature of 25° C. until the voltage reaches 3.0 V, and leaving the battery to stand for 5 minutes. Charging the battery at 0.5 C until the voltage reaches 4.45 V, and charging the battery at a constant voltage until the current reaches 0.05 C, and then leaving the battery to stand for 5 minutes. Adjusting the discharge rate and performing discharge tests at 0.2 C, 0.5 C, 1 C, 1.5 C, and 2.0 C separately to obtain corresponding discharge capacities. Calculating a ratio of the capacity of the battery discharged at each C-rate to the capacity of the battery discharged at 0.2 C. Evaluating the rate performance by comparing the ratio under 2 C and 0.2 C.

3. Testing an expansion rate of a fully charged battery: Measuring a thickness of a half-charged fresh battery by using a spiral micrometer (a full battery charged until the voltage reaches a range of 3.7 V to 4.0 V is defined as a half-charged full battery, and such a charging process is referred to as half charge). When the battery reaches a fully charged state at the end of the $400^{th}$ cycle, measuring the thickness of the battery at this time by using the spiral micrometer. Comparing the thickness at this time with the thickness of the fresh battery that is initially half charged, so as to obtain the expansion rate of the fully charged battery at this time.

III. Specific Embodiments and Comparative Embodiments

Embodiment 1

1. Selecting a Negative Electrode Material (1) Commercial oxide of silicon (SiO) particles (also referred to as $SiO_x$, 0.5<x<1.5, $D_{v50}$=5.3 μm), B=$D_{n50}/D_{v50}$=0.3; particle size range: 0.01 to 20 μm; average sphericity: 0.85; specific surface area: 1.32 $m^2 \cdot g^{-1}$.

(2) Graphite particles (formed of secondary particles and primary particles, where the weight percent of the secondary particles is 80 wt %, the remainder is the primary particles), $D_{v50}$=13.6, A=$D_{n50}/D_{v50}$=0.2; and the average sphericity is 0.65.

Figure 2:
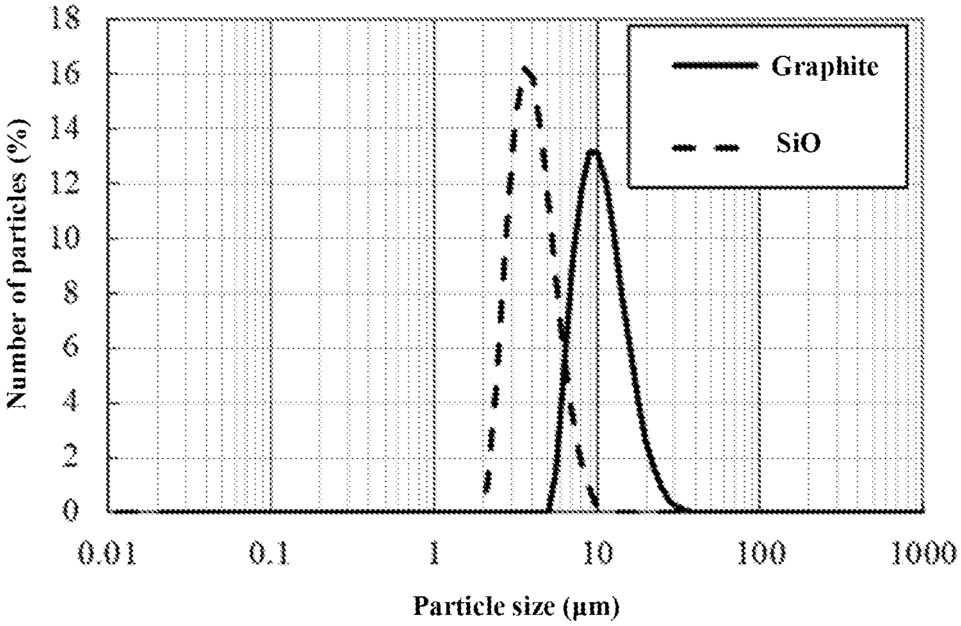
FIG. 2 is a number-based particle size distribution curve of SiO particles and graphite particles according to Embodiment 1 of the present invention.

FIG. 1 is a volume-based particle size distribution curve of the SiO particles and graphite particles, and FIG. 2 is a number-based particle size distribution curve of the SiO particles and graphite particles.

2. Preparing a Negative Electrode Plate

A method for preparing a negative electrode plate according to this embodiment includes the following steps:

(a) Mixing the SiO particles and graphite particles as the negative electrode material with nanoscale conductive carbon black as a conductive agent to obtain a first mixture, in which the weight percent of SiO particles is 15 wt %, the weight percent of the conductive agent is 2.5 wt %, and the remainder is graphite particles.

(b) Mixing the first mixture with polyacrylic acid as a binder in a deionized water solvent to obtain a first mixed slurry, in which the weight ratio between the first mixture and the binder is 100:4.

(c) Coating a current collector nickel foil with the first mixed slurry, and performing drying, cold calendering, and slitting to obtain a negative electrode plate, in which the thickness of the active layer is 150 μm, a single-side compacted density of the active layer is 1.7 g/$cm^3$, and the porosity of the active layer is 25%.

3. Preparing a Lithium-Ion Secondary Battery

A method for preparing a lithium-ion secondary battery according to this embodiment includes the following steps:

(1) Preparing a positive electrode plate: Mixing $LiCoO_2$ as a positive active material, nanoscale conductive carbon black, and polyvinylidene difluoride (PVDF) as a binder at a weight ratio of 96.7:1.7:1.6 in an N-methyl-pyrrolidone solvent system, and stirring evenly to form a slurry. Coating au aluminum foil with the slurry, and then performing drying and cold calendening, and slitting to obtain a positive electrode plate.

(2) Winding the positive electrode plate obtained in step (1), the foregoing negative electrode plate, and polyethylene (PE) porous polymer film as a separator (the pore diameter of the film is 0.01 μm to 1 μm; and the thickness of the separator is 200 μm). Winding the plates and separator to obtain a bare cell.

(3) Preparing an electrolytic solution: Adding lithium hexafluorophosphate ($LiPF_6$) into a solvent in a dry argon atmosphere, where the solvent is a mixture of propylene carbonate (PC), ethylene carbonate (EC), and diethyl carbonate (DEC) (at a weight ratio of 1:1:1). Mixing the solution homogeneously, where the concentration of $LiPF_6$ is approximately 1.15 mol/L. Adding 12 wt % fluoroethylene carbonate (FEC), and mixing the solution homogeneously to obtain an electrolytic solution.

(4) Putting the bare cell obtained in step (2) into an aluminum plastic film package, performing drying, injecting the electrolytic solution obtained in step (3) and performing sealing and chemical formation to obtain a lithium-ion secondary battery, that is, a full battery.

The performance evaluation results of the selected negative electrode material and the resulting full battery in this embodiment are shown in Table 1 (the gram capacity is a capacity obtained when the delithiation cut-off voltage is 2.0 V, the same applies below) and Table 1-1.

Embodiments 2 to 3

For differences from Embodiment 1,refer to Table 1. The performance evaluation results of the selected negative electrode material and the resulting full battery in these embodiments are shown in Table 1 and Table 1-1.

Comparative Embodiment 1

For differences from Embodiment 1, refer to Table 1. The performance evaluation results of the selected negative electrode material and the resulting full battery in these embodiments are shown in Table 1 and Table 1-1.

TABLE 1

| | $D_{n50}/D_{v50}$ | $D_{v50}$ (μm) | Specific surface area ($m^2 \cdot g^{-1}$) | Gram capacity* ($mAh \cdot g^{-1}$) | First-cycle Coulombic efficiency (%) |
|---|---|---|---|---|---|
| Matching graphite particles | 0.2 | 13.6 | 1.18 | 355 | 93.6 |
| Silicon-based particles in Embodiment 1 | 0.3 | 5.3 | 1.32 | 1679 | 68.4 |
| Silicon-based particles in Embodiment 2 | 0.5 | 5.3 | 1.27 | 1681 | 68.9 |
| Silicon-based particles in Embodiment 3 | 0.8 | 5.3 | 1.24 | 1678 | 69.3 |
| Silicon-based particles in Comparative Embodiment 1 | 0.1 | 5.3 | 1.45 | 1665 | 67.9 |

TABLE 1-1

| | $400^{th}$-cycle capacity retention rate cycled at 25° C. | $200^{th}$-cycle capacity retention rate cycled at 45° C. | $400^{th}$-cycle deformation rate cycled at 25° C. | $200^{th}$-cycle deformation rate cycled at 45° C. | Rate performance (2 C) |
|---|---|---|---|---|---|
| Embodiment 1 | 86.1% | 84.5% | 8.2% | 8.7% | 86.7% |
| Embodiment 2 | 88.0% | 87.3% | 8.0% | 8.4% | 87.3% |
| Embodiment 3 | 89.9% | 88.6% | 6.8% | 7.0% | 89.5% |
| Comparative Embodiment 1 | 81.7% | 79.4% | 9.5% | 11.0% | 82.6% |

Figure 5:
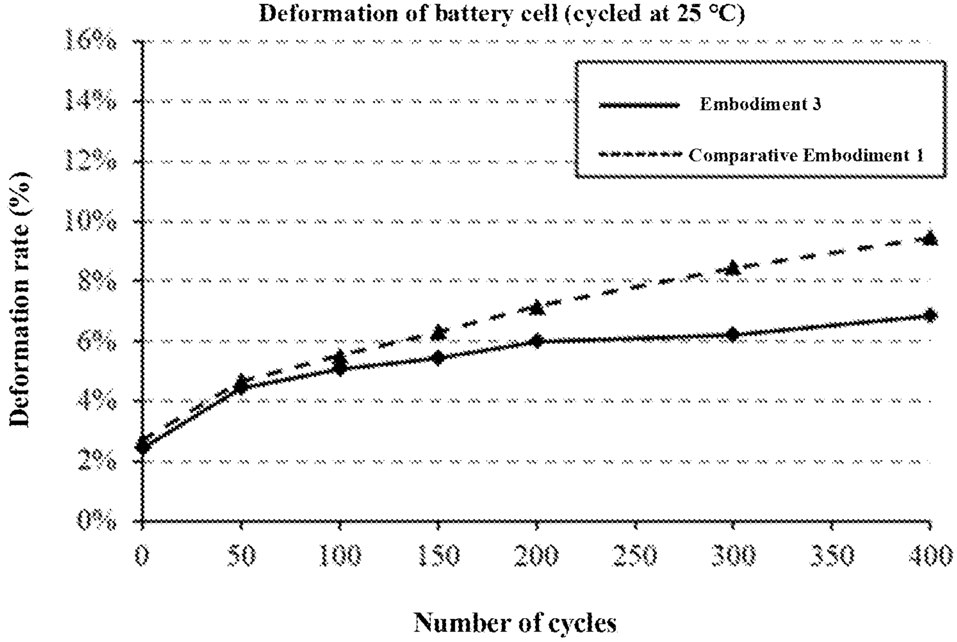
FIG. 5 shows deformation resistance performance of Embodiment 3 of the present invention versus Comparative Embodiment 1.

As can be seen from Table 1 and Table 1-1, Embodiments 1 to 3 satisfy: the $D_{n50}/D_{v50}$ ratio of the graphite particles falls within the range of 0.1 to 0.65, the $D_{n50}/D_{v50}$ ratio of the silicon-based particles falls within the range of 0.3 to 0.85, and the $D_{n50}/D_{v50}$ ratio of the silicon-based particles is greater than the $D_{n50}/D_{v50}$ ratio of the graphite particles. The performance of the finally obtained full battery is excellent. However, the performance of the full battery obtained in Comparative Embodiment 1 that does not satisfy the fOregoing conditions is significantly inferior to that in embodiments hereof. Specifically, FIG. 5 shows deformation resistance performance of Embodiment 3 versus Comparative Embodiment 1.

Embodiments 4 to 6

For differences from Embodiment 1, refer to Table 2. The performance evaluation results of the selected negative electrode material and the resulting full battery in these embodiments are shown in Table 2 and Table 2-1.

Comparative Entbodiments 2 to 3

For differences from Embodiment 4, refer to Table 2. The performance evaluation results of the selected negative electrode material and the resulting full battery in these embodiments are shown in Table 2 and Table 2-1.

TABLE 2

| | $D_{n50}/D_{v50}$ | $D_{v50}$ (μm) | Specific surface area ($m^2 \cdot g^{-1}$) | Gram capacity* ($mAh \cdot g^{-1}$) | First-cycle Coulombic efficiency (%) |
|---|---|---|---|---|---|
| Matching SiO particles | 0.7 | 5.3 | 1.24 | 1678 | 69.3 |
| Graphite particles in Embodiment 4 | 0.1 | 13.6 | 1.35 | 355 | 93.1 |
| Graphite particles in Embodiment 5 | 0.3 | 13.6 | 1.32 | 355 | 93.3 |
| Graphite particles in Embodiment 6 | 0.6 | 13.6 | 1.31 | 355 | 93.5 |
| Graphite particles in Comparative Embodiment 2 | 0.8 | 13.6 | 1.31 | 355 | 93.5 |
| Graphite particles in Comparative Embodiment 3 | 0.05 | 13.6 | 1.38 | 355 | 92.8 |

TABLE 2-1

| | $400^{th}$-cycle capacity retention rate cycled at 25° C. | $200^{th}$-cycle capacity retention rate cycled at 45° C. | $400^{th}$-cycle deformation rate cycled at 25° C. | $200^{th}$-cycle deformation rate cycled at 45° C. | Rate performance (2 C) |
|---|---|---|---|---|---|
| Embodiment 4 | 87.5% | 85.0% | 8.2% | 8.5% | 87.3% |
| Embodiment 5 | 89.0% | 88.7% | 8.1% | 8.3% | 88.3% |
| Embodiment 6 | 90.9% | 89.2% | 6.6% | 7.0% | 89.9% |

TABLE 2-1-continued

| | $400^{th}$-cycle capacity retention rate cycled at 25° C. | $200^{th}$-cycle capacity retention rate cycled at 45° C. | $400^{th}$-cycle deformation rate cycled at 25° C. | $200^{th}$-cycle deformation rate cycled at 45° C. | Rate performance (2 C) |
|---|---|---|---|---|---|
| Comparative Embodiment 2 | 80.7% | 79.4% | 9.5% | 11.0% | 84.8% |
| Comparative Embodiment 3 | 82.4% | 81.2% | 9.0% | 10.1% | 84.3% |

As can be seen from Table 2 and Table 2-1, Embodiments 4 to 6 satisfy: the $D_{n50}/D_{v50}$ ratio of the graphite particles falls within the range of 0.1 to 0.65, the $D_{n50}/D_{v50}$ ratio of the silicon-based particles falls within the range of 0.3 to 0.85, and the $D_{n50}/D_{v50}$ ratio of the silicon-based particles is greater than the $D_{n50}/D_{v50}$ ratio of the graphite particles. The performance of the finally obtained full battery is excellent. However, the performance of the full battery obtained in Comparative Embodiments 2 to 3 that do not satisfy the foregoing conditions is significantly inferior to that in embodiments hereof.

The $D_{n50}/D_{v50}$ ratio represents the degree of concentration of particle distribution. The closer the value of the ratio is to 1, the more concentrated the particle size distribution. As can be seen from the battery performance evaluation results of Embodiments 4 to 6 versus Comparative Embodiments 2 to 3 shown in Table 2 and Table 2-1, when the $D_{n50}/D_{v50}$ ratio of SiO particles is less than the $D_{n50}/D_{v50}$ ratio of graphite particles, the battery performance is relatively high. That is because lithiation-induced expansion of the silicon-based material is much larger than that of the graphite material. In order to reduce the stress generated during the expansion, the average particle diameter of the silicon-based particles is set to be smaller than that of graphite particles. When the active material on the electrode plate is compounded of the silicon-based particles and the graphite particles, the distribution of the silicon-based particles is more concentrated than the distribution of the graphite particles. This helps to disperse the silicon-based particles into voids between the packed graphite particles, and minimizes the impact caused by the expansion of the silicon-based material onto the overall expansion of the electrode plate. In addition, when the graphite remains the same, a higher $D_{n50}/D_{v50}$ ratio of SiO particles can improve the cycle performance and deformation resistance performance of the battery. That is because when the distribution of the silicon-based particles is poorly concentrated, numerous oversized or undersized particles exist. Undersized particles increase the area of contacting the electrolytic solution, give rise to a larger amount of SEI layers, and consume the electrolytic solution and the limited reversible lithium in the battery. In addition, the oversized particles increase the stress generated during the lithiation-induced expansion, cause the particles to rupture, make the fresh interface exposed to react with the electrolytic solution, consume reversible lithium, and deteriorate the cycle performance. In addition, the large particles increase diffusion paths of lithium ions, aggravate concentration polarization, and impair the rate performance of the battery.

In addition, as can be seen from Table 2 and Table 2-1. when the $D_{n50}/D_{v50}$ ratio of the gaphite particles is less than 0.1, as in Comparative Embodiment 3, excessive fine particles and large particles exist in the graphite particles. The excessive fine particles lead to an excessive specific surface area of the material, and reduce the first-cycle Coulombic efficiency. The excessive large particles increase the transmission distance of lithium ions, and deteriorate the rate performance and deformation resistance performance of the battery. When the $D_{n50}/D_{v50}$ ratio of the graphite particles is greater than 0.65, as in Comparative Embodiment 2, the particle size distribution of the graphite particles is excessively concentrated, thereby being adverse to packing the graphite particles in the negative electrode plate, aggravating deformation of the battery, deteriorating electrical contact, deteriorating the cycle performance, and increasing the processing cost significantly.

Embodiments 7 to 9

For differences from Embodiment 1, refer to Table 3. The performance evaluation results of the selected negative electrode material and the resulting full battery in these embodiments are shown in Table 3 and Table 3-1, in which $I_{1330}$ and $I_{1580}$ are the peak intensity at 1330 $cm^{-1}$ and 1580 $cm^{-1}$, respectively, in the Raman scattering peak of the corresponding graphite particle or SiO particle.

Comparative Embodiment 4

For differences from Embodiment 7, refer to Table 3. The performance evaluation results of the selected negative electrode material and the resulting full battery in these embodiments are shown in Table 3 and Table 3-1.

TABLE 3

| | Average sphericity | $I_{1330}/I_{1580}$ ratio | Specific surface area ($m^2 \cdot g^{-1}$) | Gram capacity* ($mAh \cdot g^{-1}$) | First-cycle Coulombic efficiency (%) |
|---|---|---|---|---|---|
| Matching graphite particles | 0.68 | 0.4 | 1.06 | 355 | 93.1 |
| SiO particles in Embodiment 7 | 0.92 | 1.6 | 1.28 | 1682 | 69.4 |
| SiO particles in Embodiment 8 | 0.89 | 1.6 | 1.31 | 1672 | 68.7 |
| SiO particles in Embodiment 9 | 0.85 | 1.6 | 1.28 | 1687 | 68.9 |

TABLE 3-continued

| | Average sphericity | $I_{1330}/I_{1580}$ ratio | Specific surface area ($m^2 \cdot g^{-1}$) | Gram capacity* ($mAh \cdot g^{-1}$) | First-cycle Coulombic efficiency (%) |
|---|---|---|---|---|---|
| SiO particles in Comparative Embodiment 4 | 0.75 | 1.6 | 1.35 | 1684 | 69.2 |

TABLE 3-1

| | $400^{th}$-cycle capacity retention rate cycled at 25° C. | $200^{th}$-cycle capacity retention rate cycled at 45° C. | $400^{th}$-cycle deformation rate cycled at 25° C. | $200^{th}$-cycle deformation rate cycled at 45° C. | Rate performance (2 C) |
|---|---|---|---|---|---|
| Embodiment 7 | 92.5% | 89.5% | 6.2% | 7.4% | 90.7% |
| Embodiment 8 | 91.1% | 87.2% | 7.2% | 8.3% | 91.1% |
| Embodiment 9 | 89.6% | 86.4% | 8.2% | 9.2% | 89.1% |
| Comparative Embodiment 4 | 82.7% | 80.4% | 9.5% | 10.8% | 83.6% |

As can be seen from Embodiments 7 to 9 versus Comparative Embodiment 4 shown in Table 3 and Table 3-1, as the average sphericity of SiO particles decreases, the capacity retention rate of the battery declines, and the deformation rate increases. That is because the SiO particles expand enormously during lithiation. The stress generated by the expansion ruptures the surface of the particles. Consequently, a fresh interface is exposed and contacts the electrolytic solution, thereby generating more SEI layers, and accelerating corrosion of the SiO particles by the electrolytic solution. The SiO particles with a relatively high sphericity can effectively and evenly disperse the stress generated by the lithiation-induced expansion, alleviate formation of surface cracks, reduce the SEI layers packed on the surface, and decrease the corrosion speed.

Embodiments 10 to 11

For differences from Embodiment 7, refer to Table 4, in which $I_{1330}$ and $I_{1580}$ are the peak intensity at 1330 $cm^{-1}$ and 1580 $cm^{-1}$, respectively, in the Raman scattering peak of the corresponding graphite particle or SiO particle. The performance evaluation results of the selected negative electrode material and the resulting full battery in these embodiments are shown in Table 4 and Table 4-1.

Comparative Embodiment 4

For differences from Embodiment 7, refer to Table 4. The performance evaluation results of the selected negative electrode material and the resulting full battery in these embodiments are shown in Table 4 and Table 4-1.

TABLE 4

| | Average sphericity | $I_{1330}/I_{1580}$ ratio | Specific surface area ($m^2 \cdot g^{-1}$) | Gram capacity* ($mAh \cdot g^{-1}$) | First-cycle Coulombic efficiency (%) |
|---|---|---|---|---|---|
| Matching SiO particles | 0.92 | 1.6 | 1.28 | 1682 | 69.4 |
| Graphite particles in Embodiment 7 | 0.68 | 0.4 | 1.26 | 355 | 93.1 |
| Graphite particles in Embodiment 10 | 0.62 | 0.4 | 1.37 | 355 | 93.2 |
| Graphite particles in Embodiment 11 | 0.74 | 0.4 | 1.21 | 355 | 92.9 |
| Graphite particles in Comparative Embodiment 5 | 0.84 | 0.4 | 1.38 | 355 | 92.2 |
| Graphite particles in Comparative Embodiment 6 | 0.55 | 0.4 | 1.31 | 355 | 92.3 |

TABLE 4-1

| | $400^{th}$-cycle capacity retention rate cycled at 25° C. | $200^{th}$-cycle capacity retention rate cycled at 45° C. | $400^{th}$-cycle deformation rate cycled at 25° C. | $200^{th}$-cycle deformation rate cycled at 45° C. | Rate performance (2 C) |
|---|---|---|---|---|---|
| Embodiment 7 | 92.5% | 89.5% | 6.2% | 7.4% | 90.7% |
| Embodiment 10 | 91.0% | 87.1% | 6.8% | 8.3% | 89.1% |
| Embodiment 11 | 89.6% | 86.4% | 7.8% | 9.0% | 89.1% |
| Comparative Embodiment 5 | 82.7% | 80.4% | 9.5% | 10.8% | 82.6% |
| Comparative Embodiment 6 | 83.9% | 81.7% | 9.2% | 10.5% | 84.2% |

As can be seen from the battery performance evaluation results of Embodiments 7 and 10 to 11 versus Comparative Embodiments 5 and 6 shown in Table 4 and Table 4-1, both deficient sphericity and excessive sphericity of the graphite particles affect electrochemical performance of the battery. When the average sphericity of the graphite particles is excessive, the silicon-based particles are unable to fill in the pores between the gaphite particles, thereby increasing the shift of the $SiO_x$ particles caused during expansion and shrinkage of the material, aggravating deformaticm of the battery, and resulting in capacity fading. When the sphericity of the graphite is deficient, anisotropy increases, thereby slowing down the intercalation speed of lithium ions, and affecting the kinetics of the battery.

Embodiments 12 to 14

Figure 3:
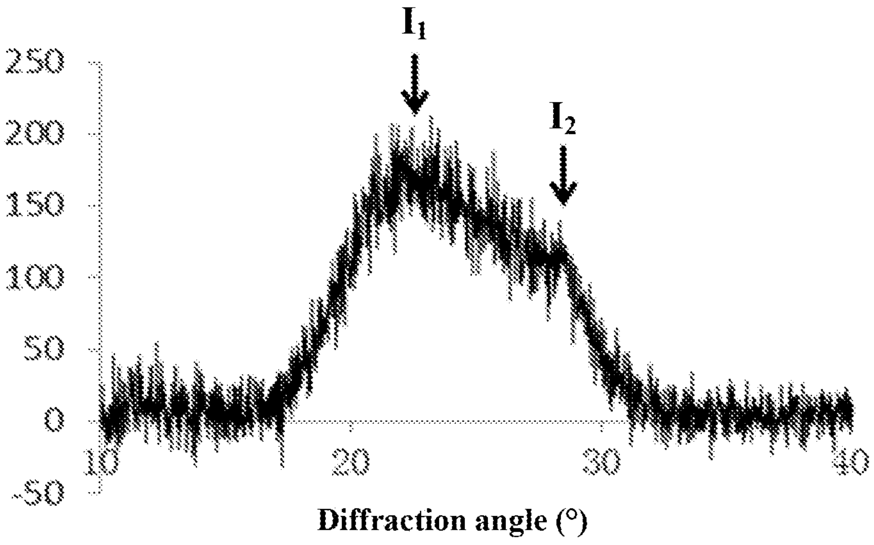
FIG. 3 is an X-ray diffractogram according to Embodiment 12 of the present invention.
Figure 4:
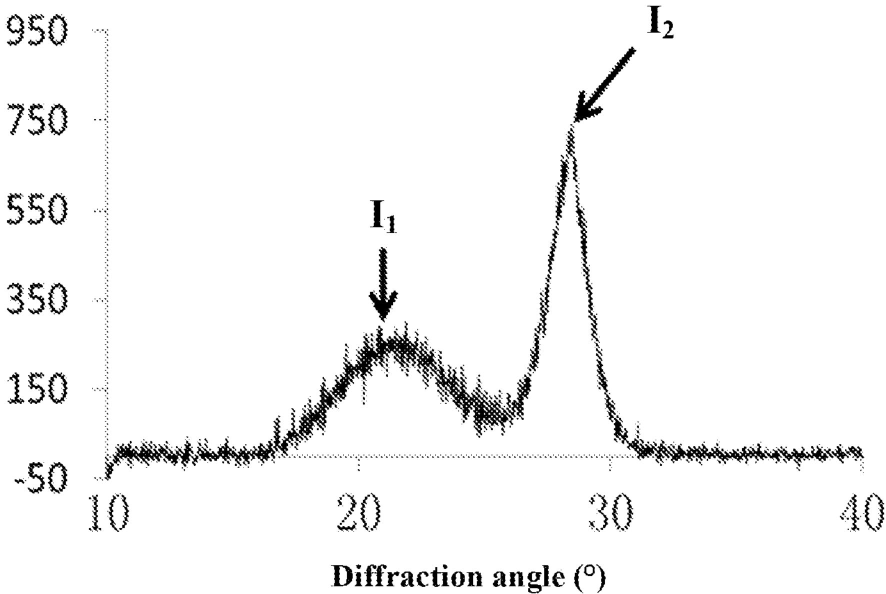
FIG. 4 is an X-ray diffractogram according to Embodiment 14 of the present invention.

For differences from Embodiment 7, refer to Table 5, in which I1 is a maximum intensity value in an X-ray diffractogram of the corresponding SiO particles when 2θ falls within a range of 20.5° to 21.5°, and I2 is the maximum intensity value in the X-ray diffractogam of the corresponding SiO particles when 2θ falls within a range of 28.0° to 29.0°. The performance evaluation results of the selected negative electrode material and the resulting full battery in these embodiments are shown in Table 5 and Table 5-1. FIG. 3 and FIG. 4 show an X-ray diffractogram of the SiO particles according to Embodiments 12 and 14 respectively.

Comparative Embodiment 7

For differences from Embodiment 7, refer to Table 5. The performance evaluation results of the selected negative electrode material and the resulting full battery in these embodiments are shown in Table 5 and Table 5-1.

As can be seen Embodiments 7, 12, 13, and 14 versus Comparative Embodiment 7 shown in Table 5 and Table 5-1, with the increase of the I2/I1 ratio, the cycle performance keeps declining, the expansion increases, and the rate performance deteriorates. The I2/I1 ratio value reflects the impact caused by disproportionation onto the SiO particles. When the value is higher the size of nano-silicon crystal grains caused by disproportionation inside the SiO particles is larger. Consequently, the stress in a local region of the active layer increases sharply during lithiation, thereby disrupting the structure of the material in the negative electrode plate during cycles. In addition, the resulting nanocrystalline distribution affects the capability of grain boundary diffusion during ion diffusion.

Embodiments 15 to 17

For differences from Embodiment 7, refer to Table 6, in which D is a peak intensity at 1330 $cm^{-1}$ in a Raman scattering peak of the graphite particles, and G is a peak intensity at 1580 $cm^{-1}$ in the Raman scattering peak of the graphite particles. The performance evaluation results of the selected negative electrode material and the resulting full battery in these embodiments are shown in Table 6 and Table 6-1.

Comparative Embodiments 8 to 9

For differences from Embodiment 15, refer to Table 6. The performance evaluation results of the selected negative electrode material and the resulting full batter in these embodiments are shown in Table 6 and Table 6-1.

TABLE 5

| | I2/I1 ratio | $D_{v50}$ (μm) | Specific surface area ($m^2 \cdot g^{-1}$) | Gram capacity* ($mAh \cdot g^{-1}$) | First-cycle Coulombic efficiency (%) |
|---|---|---|---|---|---|
| Matching graphite particles | / | 14.1 | 1.06 | 355 | 92.6 |
| SiO particles in Embodiment 7 | 0.41 | 5.6 | 1.28 | 1682 | 69.4 |
| SiO particles in Embodiment 12 | 0.64 | 5.6 | 1.31 | 1672 | 68.7 |
| SiO particles in Embodiment 13 | 1 | 5.6 | 1.28 | 1687 | 68.9 |
| SiO particles in Embodiment 14 | 2.5 | 5.6 | 1.29 | 1679 | 69.6 |
| SiO in Comparative Embodiment 7 | 12 | 5.6 | 1.26 | 1681 | 69.8 |

TABLE 5-1

| | $400^{th}$-cycle capacity retention rate cycled at 25° C. | $200^{th}$-cycle capacity retention rate cycled at 45° C. | $400^{th}$-cycle deformation rate cycled at 25° C. | $200^{th}$-cycle deformation rate cycled at 45° C. | Rate performance (2 C) |
|---|---|---|---|---|---|
| Embodiment 7 | 92.5% | 89.5% | 6.2% | 7.4% | 86.7% |
| Embodiment 12 | 91.1% | 87.2% | 7.2% | 8.3% | 86.1% |
| Embodiment 13 | 88.6% | 84.4% | 8.4% | 9.2% | 85.1% |
| Embodiment 14 | 86.6% | 82.5% | 8.5% | 9.7% | 85.1% |
| Comparative Embodiment 7 | 83.7% | 80.4% | 9.5% | 10.8% | 83.6% |

TABLE 6

| | Intensity ratio of D versus G | $D_{v50}$ (μm) | Specific surface area ($m^2 \cdot g^{-1}$) | Gram capacity* ($mAh \cdot g^{-1}$) | First-cycle Coulombic efficiency (%) |
|---|---|---|---|---|---|
| Matching SiO particles | / | 5.6 | 1.68 | 1679 | 68.8 |
| Graphite particles in Embodiment 15 | 9.2 | 14.5 | 1.20 | 355 | 93.5% |
| Graphite particles in Embodiment 16 | 0.5 | 14.5 | 1.25 | 355 | 93.1% |
| Graphite particles in Embodiment 17 | 0.8 | 14.5 | 1.30 | 353 | 92.8% |
| Graphite particles in Comparative Embodiment 8 | 0.01 | 14.5 | 1.44 | 352 | 92.3% |
| Graphite particles in Comparative Embodiment 9 | 1.2 | 14.5 | 1.41 | 352 | 92.4% |

TABLE 6-1

| | $400^{th}$-cycle capacity retention rate cycled at 25° C. | $200^{th}$-cycle capacity retention rate cycled at 45° C. | $400^{th}$-cycle deformation rate cycled at 25° C. | $200^{th}$-cycle deformation rate cycled at 45° C. | Rate performance (2 C) |
|---|---|---|---|---|---|
| Embodiment 15 | 89.1% | 86.5% | 8.0% | 8.7% | 85.7% |
| Embodiment 16 | 91.0% | 87.3% | 7.3% | 8.1% | 90.3% |
| Embodiment 17 | 88.9% | 84.6% | 8.4% | 9.2% | 89.1% |
| Comparative Embodiment 8 | 85.7% | 82.4% | 9.3% | 10.3% | 76.6% |
| Comparative Embodiment 9 | 81.7% | 79.4% | 9.8% | 11.3% | 80.6% |

As can be seen from the battery performance evaluation results of Embodiments 15 to 17 and Comparative Embodiments 8 to 9 shown in Table 6 and Table 6-1, when the D/G ratio, that is, an intensity ratio of the Raman scattering peak of the graphite particles, is deficient, the degree of surface order is high of the particles, the material can hardly be infiltrated by the electrolytic solution, and the kinetic properties of the battery deteriorate. When the D/G ratio of the Raman scattering peak of the graphite particles is excessive, the coating on the surface of the graphite particles is excessively thick and contains a large amount of defective amorphous carbon coating, thereby decreasing the first-cycle Coulombic efficiency and the gram capacity of the material. In addition, the excessively thick amorphous carbon layer consumes some lithium ions, and leads to acceleration of capacity fading.

Embodiment 18

A difference from Embodiment 1 is that a coating exists on the surface of the SiO particles. Table 7 shows the type and content of metal elements and the carbon content in the coating (in which "–" indicates that the corresponding substance is not added). In addition, the thickness of the coating is 10 nm, and the mass of the coating is 0.425% of the total mass of the SiO particles.

The performance evaluation results of the selected negative electrode material and the resulting full battery in these embodiments are shown in Table 7 and Table 7-1.

Embodiments 19 to 21

For differences from Embodiment 18, refer to Table 7. The performance evaluation results of the selected negative electrode material and the resulting battery in these embodiments are shown in Table 7 and Table 7-1.

TABLE 7

| | Type of metal element | Content of metal element (wt %) | Carbon content (wt %) | Specific surface area ($m^2/g$) | Gram capacity* ($mAh \cdot g^{-1}$) | First-cycle Coulombic efficiency (%) |
|---|---|---|---|---|---|---|
| SiO particles in Embodiment 1 | — | — | — | 1.32 | 1679 | 68.4 |
| SiO particles in Embodiment 18 | Al | 0.125 | 0.300 | 1.45 | 1672 | 68.3 |
| SiO particles in Embodiment 19 | Ti | 0.125 | 0.300 | 1.44 | 1676 | 74.0 |
| SiO particles in Embodiment 20 | Al + Ti | 0.125 | 0.300 | 1.53 | 1681 | 70.2 |
| SiO particles in Embodiment 21 | — | — | 0.300 | 1.39 | 1692 | 74.2 |

TABLE 7-1

| | $400^{th}$-cycle capacity retention rate cycled at 25° C. | $200^{th}$-cycle capacity retention rate cycled at 45° C. | $400^{th}$-cycle deformation rate cycled at 25° C. | $200^{th}$-cycle deformation rate cycled at 45° C. | Rate performance (2 C) |
|---|---|---|---|---|---|
| Embodiment 1 | 86.1% | 84.5% | 8.2% | 8.7% | 86.7% |
| Embodiment 18 | 89.0% | 87.3% | 6.3% | 7.1% | 90.3% |
| Embodiment 19 | 88.9% | 84.6% | 6.7% | 7.2% | 89.1% |
| Embodiment 20 | 86.7% | 84.4% | 7.1% | 7.7% | 79.6% |
| Embodiment 21 | 86.3% | 84.7% | 7.8% | 8.3% | 80.6% |

As can be seen from the test results of Embodiment 1 and Embodiments 18 to 21 shown in Table 7 and Table 7-1, under the same condition that the particle size matching relationship is satisfied, the coating existent on the surface of SiO particles further improves the cycle performance and/or rate performance and deformation resistance of the lithium-ion battery. In addition, the carbon coating formed by aluminum and carbon can further improve the cycle performance and/or rate performance and deformation resistance of the lithium-ion battery.

Understandably, a plurality of other embodiments of the present invention are conceivable. Various modifications and variations, which may be made by a person skilled in the art based on the present invention without departing from the spirit and essence of the present invention, still fall within the protection scope of the present invention.

What is claimed is:

1. A negative electrode material, wherein the negative electrode material contains silicon-based particles and graphite particles; wherein, $0.1 \le A \le 0.65$, wherein A is a $D_{n50}/D_{v50}$ ratio of the graphite particles;

$0.3 \le B \le 0.85$, wherein B is a $D_{n50}/D_{v50}$ ratio of the silicon-based particles; and $$B > A;$$

wherein, $D_{v50}$ is a particle diameter of particles measured when a cumulative volume fraction in a volume-based distribution reaches 50%; and $D_{n50}$ is a particle diameter of particles measured when a cumulative number fraction in a number-based distribution reaches 50%; and in an X-ray diffractogram of the silicon-based particles, a maximum intensity value when 2θ falls within a range of 20.5° to 21.5° is I1 and a maximum intensity value when 2θ falls within a range of 28.0° to 29.0° is I2, and I2/I1 is less than or equal to 1.

2. The negative electrode material according to claim 1, wherein $$0.1 \le D - C \le 0.3;$$

C is an average sphericity of the graphite particles and D is an average sphericity of the silicon-based particles.

3. The negative electrode material according to claim 1, wherein an average sphericity D of the silicon-based particles is greater than or equal to 0.8.

4. The negative electrode material according to claim 1, wherein an average sphericity C of the graphite particles falls between 0.55 and 0.75.

5. The negative electrode material according to claim 1, wherein a general formula of the silicon-based particles is $SiO_xC_yM_z$ (I), wherein $0 \le x \le 2$, $0 \le y \le 1$, $0 \le z \le 0.5$, and M comprises at least one of lithium, magnesium, titanium, or aluminum;

a coating is provided on a surface of the silicon-based particles, a thickness of the coating is 0.5 to 50 nm, and a mass of the coating is 0.1% to 10% of a total mass of the silicon-based particles, wherein the coating is a carbon coating, a polymer coating or a composited coating of carbon and polymer;

a particle diameter range of the silicon-based particles is 0.01 to 50 μm, and a specific surface area of the silicon-based particles is 0.1 to 50 $m^2/g$.

6. The negative electrode material according to claim 1, wherein the graphite particles comprise a secondary particle, and a weight percent of the secondary particle is at least 70 wt % of a total weight of the graphite particles;

a carbon coating, a polymer coating, or a composite coating of carbon and polymer is provided on a surface of the graphite particles;

in a Raman scattering peak of the graphite particles, a peak intensity at 1330 $cm^{-1}$ is $I_{1330}$ and a peak intensity at 1580 $cm^{-1}$ is $I_{1580}$, wherein $$0.05 \le I_{1330}/I_{1580} \le 0.9; \text{ and}$$

in an X-ray diffraction peak of the graphite particles, a peak intensity ratio between a (004) peak and a (110) peak is an orientation index (OI) value, and $$1 \le \text{orientation index (OI) value} \le 30 \quad (6).$$

7. The negative electrode material according to claim 5, wherein the carbon coating comprises at least one of amorphous carbon, carbon nanotubes, carbon nanoparticles, vapor grown carbon fibers, or graphene; and the polymer coating is formed by at least one of polyvinylidene difluoride or a derivative thereof, carboxymethyl cellulose or a derivative thereof, polyvinylpyrrolidone or a derivative thereof, polyacrylic acid or a derivative thereof, or polystyrene butadiene rubber.

8. The negative electrode material according to claim 6, wherein the carbon coating comprises at least one of amorphous carbon, carbon nanotubes, carbon nanoparticles, vapor grown carbon fibers, or graphene; and the polymer coating is formed by at least one of polyvinylidene difluoride or a derivative thereof, carboxymethyl cellulose or a derivative thereof, polyvinylpyrrolidone or a derivative thereof, polyacrylic acid or a derivative thereof, or polystyrene butadiene rubber.

9. The negative electrode material according to claim 1, wherein an average sphericity D of the silicon-based particles is greater than or equal to 0.9.

10. The negative electrode material according to claim 1, wherein an average sphericity C of the graphite particles falls between 0.55 and 0.6.

11. The negative electrode material according to claim 1, wherein an average sphericity C of the graphite particles falls between 0.6 and 0.75.

12. An electrochemical device, comprising a negative electrode material, wherein the negative electrode material contains silicon-based particles and graphite particles, and, a $D_{n50}/D_{v50}$ ratio of the graphite particles is A and a $D_{n50}/D_{v50}$ ratio of the silicon-based particles is B, wherein:

$$0.1 \leq A \leq 0.65;$$

$$0.3 \leq B \leq 0.85; \text{ and}$$

$$B>A,$$

wherein, $D_{v50}$ is a particle diameter of particles measured when a cumulative volume fraction in a volume-based distribution reaches 50%; and $D_{n50}$ is a particle diameter of particles measured when a cumulative number fraction in a number-based distribution reaches 50%; and in an X-ray diffractogram of the silicon-based particles, a maximum intensity value when 2θ falls within a range of 20.5° to 21.5° is I1 and a maximum intensity value when 2θ falls within a range of 28.0° to 29.0° is I2, and I2/I1 is less than or equal to 1.

13. The electrochemical device according to claim 12, wherein an average sphericity D of the silicon-based particles is greater than or equal to 0.9.

14. The electrochemical device according to claim 12, wherein an average sphericity C of the graphite particles falls between 0.55 and 0.6.

15. The electrochemical device according to claim 12, wherein an average sphericity C of the graphite particles falls between 0.6 and 0.75.

16. An electronic device, comprising the electrochemical device according to claim 12.

17. The negative electrode material according to claim 5, wherein the specific surface area of the silicon-based particles is 0.1 to 5 $m^2/g$.

18. The negative electrode material according to claim 1, wherein I2/I1 is less than or equal to 0.64.

19. The negative electrode material according to claim 1, wherein an average particle diameter of the silicon-based particles is smaller than an average particle diameter of the graphite particles.

20. The electrochemical device according to claim 12, wherein an average particle diameter of the silicon-based particles is smaller than an average particle diameter of the graphite particles.

* * * * *